Aug. 25, 1959  C. D. BRANSON  2,901,174

THERMOSTATICALLY CONTROLLED MIXING VALVES

Filed June 6, 1957

INVENTOR.
Charles D. Branson.

BY

HIS ATTORNEY.

United States Patent Office 2,901,174
Patented Aug. 25, 1959

2,901,174

THERMOSTATICALLY CONTROLLED MIXING VALVES

Charles D. Branson, Greensburg, Pa., assignor to Robertshaw-Fulton Controls Company, Greensburg, Pa., a corporation of Delaware Application June 6, 1957, Serial No. 663,954

2 Claims. (Cl. 236—12)

This invention relates to thermostatically controlled mixing valves wherein the relative amounts of fluid from two different sources are proportioned to achieve a fluid stream of predetermined temperature.

This invention relates more particularly to a valve seat which will permit override travel and also to a mixing valve construction whereby the temperature of a fluid stream can be more accurately controlled.

Previously the thermostatic control elements were located adjacent the mixing chamber and therefore responsive to poorly mixed fluids. Also prior to this invention, mixing valves contained a multiplicity of chambers and parts and as a result were bulky, expensive and unattractive.

It is an object of this invention to provide a valve seat which will permit override travel.

It is another object of this invention to accurately control the temperature of a fluid stream.

It is still a further object of this invention to produce a mixing valve that is simple in construction and efficient in operation.

In the preferred embodiment of this invention, a resilient valve seat is provided so that a valve may close an opening to prevent fluid flow while still being movable through the opening.

Other objects and advantages of this invention will become apparent by reference to the following description taken in connection with the accompanying drawing wherein.

Figure 1:
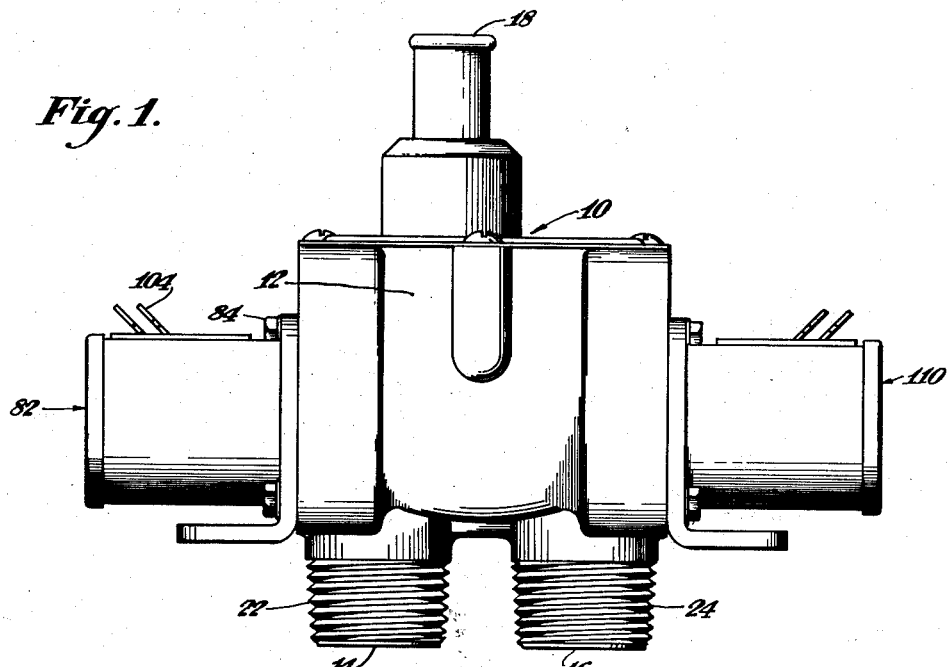
Fig. 1 is a front elevation view of a mixing valve embodying the invention.
Figure 2:
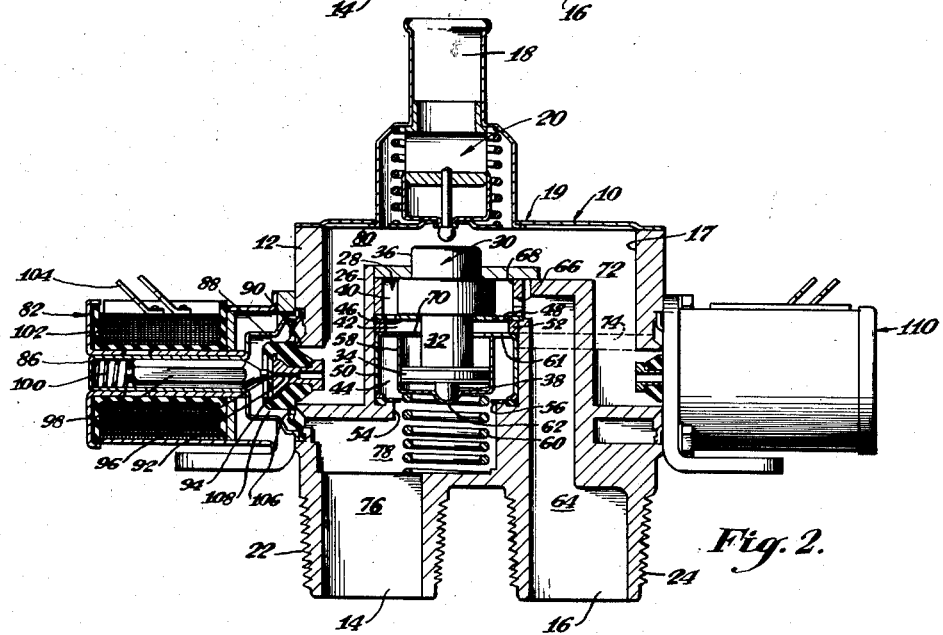
Fig. 2 is a longitudinal section of Fig. 1.

Referring more particularly to the drawing, the mixing valve, indicated generally at 10, comprises a casing 12 having in substantially parallel relation a hot fluid inlet 14 and a cold fluid inlet 16 and an open end 17 disposed opposite the inlets 14, 16. An outlet 18 is carried on a closure plate 19 for the open end 17. A flow control assembly, positioned within the outlet 18, is indicated generally at 20. It will suffice to say that the flow control assembly 20 will deliver fluid at a fixed rate at varying supply pressures and, since the flow control assembly 20 does not form part of this invention, no further description is deemed necessary.

The hot and cold inlets 14, 16 are provided with nipples 22 and 24, respectively, for connection to any suitable source of supply (not shown). An inner cylindrical wall 26 of the casing 12 defines a chamber 28 in which a thermostatic element 30 is mounted. The thermostatic element 30 is preferably of the pressure insensitive type as shown and is comprised of a stationary neck portion 32 with a sealing disc 34 mounted thereon, a container 36 for a thermally responsive material (not shown) and a stem 38 which reciprocates depending upon the ambient temperature adjacent the container 36.

The chamber 28 is separated into two fluid chambers 40 and 42 and a mixing chamber 44 by a disc-like member 46 having apertures 48 and a cup-shaped member 50.

The cup-shaped member 50 is supported between a cylindrical spacer member 52 which bears on disc-like member 46 and a flange portion 54 of the wall 26. An annular member 56, which may be made of any suitable resilient material such as rubber, is seated between cup-shaped member 50 and the flange portion 54. The diameter of the opening in the annular member 56 is slightly smaller than the diameter of a valve member 58 for a purpose apparent hereinafter.

The cylindrical valve member 58 is positioned in the mixing chamber 44 and is normally urged by a resilient member in the form of a coil spring 60 into engagement with one face of the cup-shaped member 50 which forms a valve seat 61. The valve member 58 is engaged by the stem 38 of thermostatic element 30 and has a recessed portion 62 for its reception. The stem 38 will reciprocate and move the valve member 58 against the bias of the spring 60 under certain thermal conditions. Such movement of the valve member 58 will cause its disengagement from the cup-shaped member 50 and thus assure an open valve position.

A passage 64 in the casing 12 connects the cold fluid inlet with an orifice 66 formed in an annular member 68 which encloses chamber 40. Cold fluid will then flow from chamber 40 through aperture 48 into chamber 42. A valve opening 70 is formed in the valve seat 61 of cup-shaped member 50 and communicates with chamber 42 and with the chamber 44 under control of the valve member 58. The mixing chamber 44 is connected to an outlet passage 72 formed in the casing 12 by a passage 74 (shown in dotted lines).

The hot water inlet 14 communicates with the cup-shaped member 50 by passages 76 and 78 formed in the casing 12 and the hot fluid flows directly to the mixing chamber 44. However, upon movement of the stem 38 outwardly of neck 32, the cylindrical valve member 58 is forced through the annular member 56 and will cut off the flow of hot fluid to the mixing chamber 44. Excessive movement of the stem 38 under high ambient temperatures will move cylindrical valve member 58 farther into chamber 78 without damage to the parts. The annular member 56 thus forms a resilient valve seat that will permit override travel of the cylindrical valve member 58 and eliminates a separate override spring.

If so desired, the flow of hot fluid may by-pass chamber 28 and be supplied directly to the outlet 18. This is accomplished by provision of a by-pass passage 80 which is formed in the casing 12 to communicate with passage 76 when a diaphragm-type valve 82 now to be described is in its open position.

The diaphragm type valve 82 is attached to casing 12 by any suitable means, such as bolts 84, and has a diaphragm 88 extending into by-pass passage 80. A fluid-tight cap 86 extends over the diaphragm 88 and secures the perimeter of the diaphragm 88 to the casing 12. The diaphragm 88 is seated upon an annular valve seat 90 communicating with the passage 80 and is provided with an insert 92 integrally molded with the material of the diaphragm 88. The insert 92 is provided with an orifice 94 controlled by a conical valve 96 of a fluid control armature 98.

The armature 98 is biased to cause the valve 96 to close orifice 94 by an armature spring 100. The armature 98 is constructed of magnetic material and will respond to the magnetic field due to current flow within a surrounding solenoid 102. The solenoid 102 may be connected to a suitable source of electrical energy (not shown) by the terminals 104.

Small bleed holes 106 are provided in the diaphragm 88 so that when the conical valve 96 closes the orifice 94 therein, the pressure within chamber 108 in the valve 82 and above the diaphragm 88 is substantially equal to the pressure within the passage 76. The diaphragm 88 serves to separate the chamber 108 and the passage 76 which are connected by the bleed holes 106.

Inasmuch as the surface area exposed to the fluid pressure on one side of the diaphragm 88, that is, the side contiguous to the conical valve 96, exceeds the surface area exposed thereto on the other side thereof, the diaphragm 88 is pressed inwardly against the valve seat 90, and no fluid flow takes place from the passage 76 to the outlet passage 80. However, if the armature 98 is retracted to cause the valve 96 to open the orifice 94, then fluid flows from the passage 76 to the chamber 108. By reason of the restricted area of the bleed holes 106, the pressure in the chamber 108 approaches that of the pressure on the other side of the diaphragm 88 and causes motion thereof away from the valve seat 90, thereby permitting fluid flow from the passage 76 to the outlet passage 80 and through outlet 18. In this manner, the hot fluid entering the inlet 14 may be by-passed to the discharge outlet 18 upon the solenoid being actuated so that the armature 98 is raised permitting the unseating of the diaphragm 88 from the valve seat 90.

When return movement of the armature 98 causes the valve 96 to close the opening 94, fluid flows through the restricted passage 106 to the chamber 108 and eventually builds up pressure therein corresponding to the unit fluid pressure within passage 76. This removes the outward force upon the diaphragm 88 associated with the total pressure difference between the chamber 108 and the passage 76 and causes closure of the valve 82. It is thus apparent that fluid flow through passages 76 and 80 is precisely controlled by the energization or de-energization of the solenoid 82 and the position of the armature 98.

A similar diaphragm-type valve 110 is positioned on the casing 12 opposite the valve 82 described and serves to control the flow of fluid from mixing chamber 44 to outlet 18. Since this valve 110 may be identical in all respects to the valve 88, further description is deemed unnecessary.

In operation, cold fluid enters inlet 16 and flows through passage 64, orifice 66, chambers 40 and 42 to the cylindrical valve member 58 adjacent the mixing chamber 44 where it is retained by seal 34. The hot fluid enters inlet 14 and flows through passage 76 and chamber 78 directly to mixing chamber 44. Passage 74 (shown in dotted lines) and outlet passage 72 connect the mixing chamber 44 with outlet 18. Flow in these passages is controlled by diaphragm-type valve 110.

If the temperature of the fluid leaving the mixing valve 10 is higher than desired, thermostatic element 30 will unseat the cylindrical valve member 58 and permit cold fluid to enter the mixing chamber 44. It should be noted that the container 36 for the thermally responsive material of thermostatic element 30 is located adjacent outlet 18 and therefore is subject to the thoroughly mixed fluids leaving the mixing valve 10. The cylindrical valve member 58 also regulates the inflow of hot fluid by entering annular ring member 56 to stop flow therethrough. Should there be an exceedingly large movement of stem 38, the cylindrical valve member 58 will merely be forced further into chamber 78 and no damage will result.

If flow from the hot fluid inlet 14 alone should be desired, diaphragm-type valve 110 may be closed, stopping flow from the mixing chamber 44 and diaphragm-type valve 82 may be opened permitting flow from passage 76 by by-pass passage 80. If a temperature intermediate the hot fluid temperature and the mixed temperature should be desired, it is apparent that both diaphragm valves 82 and 110 may be opened thereby permitting flow in outlet passage 72 and by-pass passage 80 simultaneously.

While I have shown a particular embodiment of this invention, it will be understood that I do not wish to be limited thereto, since many modifications both in elements employed and their cooperative structure, may be made without departing from the scope of this invention.

I claim:

1. In a fluid valve, a cylindrical shaped body member having an open end and an orifice opposite said open end, a cylindrical valve member disposed in said body member and having a closed end and an open end, the diameter of said cylindrical valve member being greater than that of said orifice, resilient means for biasing said open end of said cylindrical valve member to cover said orifice to prevent fluid flow therethrough, a thermostatic element connected to said cylindrical valve member for moving the same away from said orifice in response to a predetermined temperature condition to permit fluid flow therethrough, and a resilient ring rigidly connected within said body member and having an inside diameter smaller than the diameter of said cylindrical valve member, said thermostatic element being adapted for moving said closed end of said cylindrical valve member through said resilient ring in response to another predetermined temperature condition to present fluid flow through said open end of said body member, said resilient ring maintaining fluid-tight contact with said cylindrical valve member upon overtravel thereof against the bias of the same said resilient means.

2. In a mixing valve, a casing having hot and cold fluid inlets and an outlet, a cylindrical shaped body member formed in said casing and having an open end and an orifice opposite said open end, means forming a first passage connecting said hot fluid inlet with said open end, means forming a second passage connecting said cold fluid inlet with said orifice, means forming a third passage connecting said body member with said casing outlet, control means responsive to an external condition for controlling fluid flow in said third passage, means forming a bypass passage connecting said hot fluid inlet with said casing outlet, another control means responsive to an external condition for controlling fluid flow in said bypass passage, a thermostatic element partially housed in said cylindrical body member and having a temperature sensitive portion extending into said third passage, a cylindrical valve member disposed in said body member and having a closed end and an open end, the diameter of said cylindrical valve member being greater than that of said body orifice, resilient means biasing said open end of said cylindrical valve member to cover said body orifice to prevent fluid flow therethrough, said thermostatic element being connected to said cylindrical valve member for moving the same away from said body orifice in response to a predetermined temperature of fluid in said third passage, and a resilient ring rigidly connected within said body member and having an inside diameter smaller than the diameter of said cylindrical valve member, said thermostatic element being adapted for moving said closed end of said cylindrical valve member through said resilient ring in response to another predetermined temperature of fluid in said third passage to prevent fluid flow through said open end of said body member, said resilient ring maintaining fluid-tight contact with said cylindrical valve member upon overtravel thereof against the bias of the same said resilient means.

References Cited in the file of this patent

UNITED STATES PATENTS

| 1,000,435 | Pagelsen | Aug. 15, 1911 |
| 2,419,630 | Cruzan et al. | Apr. 29, 1947 |
| 2,509,656 | Tomoser | May 30, 1950 |
| 2,524,142 | Seeloff | Oct. 3, 1950 |
| 2,620,134 | Obermaier | Dec. 2, 1952 |
| 2,778,598 | Bolling | Jan. 22, 1957 |
| 2,830,765 | Beller | Apr. 1, 1958 |

FOREIGN PATENTS

| 234,563 | Great Britain | June 4, 1925 |
| 209,415 | Switzerland | Apr. 15, 1940 |